United States Patent
Bastholm

(10) Patent No.: US 8,040,082 B2
(45) Date of Patent: Oct. 18, 2011

(54) LINEAR ACTUATOR

(75) Inventor: Jeppe Bastholm, Sønderborg (DK)

(73) Assignee: Linak A/S, Nordborg (DK)

( * ) Notice: Subject to any disclaimer, the term of this patent is extended or adjusted under 35 U.S.C. 154(b) by 332 days.

(21) Appl. No.: 12/227,223

(22) PCT Filed: May 14, 2007

(86) PCT No.: PCT/DK2007/000230
§ 371 (c)(1),
(2), (4) Date: Nov. 12, 2008

(87) PCT Pub. No.: WO2007/131509
PCT Pub. Date: Nov. 22, 2007

(65) Prior Publication Data
US 2009/0091287 A1    Apr. 9, 2009

(30) Foreign Application Priority Data

May 13, 2006    (DK) ................................. 2006 00674

(51) Int. Cl.
*H02K 41/00* (2006.01)
(52) U.S. Cl. ......................... 318/135; 318/603; 318/627
(58) Field of Classification Search .................. 318/135, 318/603, 627, 468, 434, 105, 34, 37, 466, 318/803, 800; 310/80, 83
See application file for complete search history.

(56) References Cited

U.S. PATENT DOCUMENTS

| | | | |
|---|---|---|---|
| 5,053,685 A | 10/1991 | Bacchi | |
| 5,224,429 A | 7/1993 | Borgman et al. | |
| 2,264,746 A | 12/1994 | Ellwood | |
| 6,945,131 B2 | 9/2005 | Dewert | |
| 7,003,828 B2 | 2/2006 | Roussy | |
| 7,350,634 B2 | 4/2008 | Baehr et al. | |

(Continued)

FOREIGN PATENT DOCUMENTS

DE          8903603          6/1989

(Continued)

OTHER PUBLICATIONS

English Abstract of DE19843431, Mar. 25, 1999.

(Continued)

*Primary Examiner* — Karen Masih
(74) *Attorney, Agent, or Firm* — Dykema Gossett PLLC

(57) ABSTRACT

A linear actuator includes a spindle nut, where the spindle nut and the spindle between a first and a second point, indicating the length of stroke, can move axially in proportion to each other, depending on whether the spindle or the spindle nut is being driven around via the transmission, and where the position is determined with incremental position sensors, such as at least two Hall sensors or Reed-switches. For determining the position an initiating procedure, where the nut/spindle is moved from a first point on the spindle/nut to a second point on the spindle nut is carried out, and that the number of pulses from the incremental position sensors appearing by it are registered as a measurement for the length of stroke, and the position is subsequently determined in relation to that. It is noted that the control is active before, during and after the operation of the motor. Hereby, absolute position detection is achieved with incremental sensors, where one formerly was obliged to use rotary potentiometers. Simultaneously an optional determination of the length of stroke and its position and immediate possibility to change the same at any time is achieved.

11 Claims, 4 Drawing Sheets

U.S. PATENT DOCUMENTS

2008/0129133 A1* 6/2008 Taube et al. .................. 310/80

FOREIGN PATENT DOCUMENTS

| DE | 19843431 | 3/1999 |
|---|---|---|
| DK | 174457 | 3/2002 |
| EP | 0328972 | 8/1989 |
| WO | 02102205 | 12/2002 |

OTHER PUBLICATIONS

English Abstract of WO 02102205.
English Abstract of DK 174457.

* cited by examiner

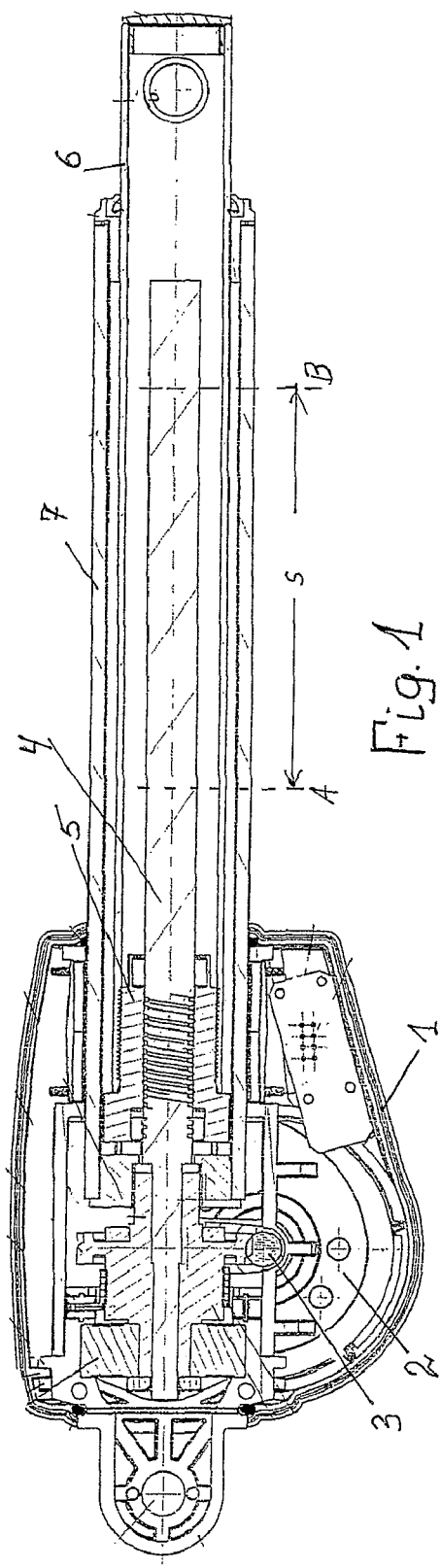
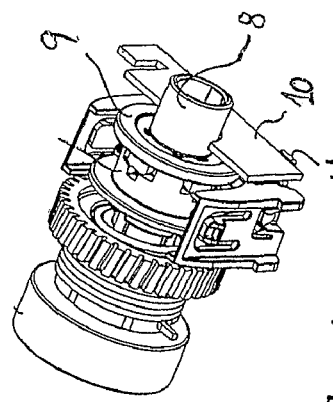

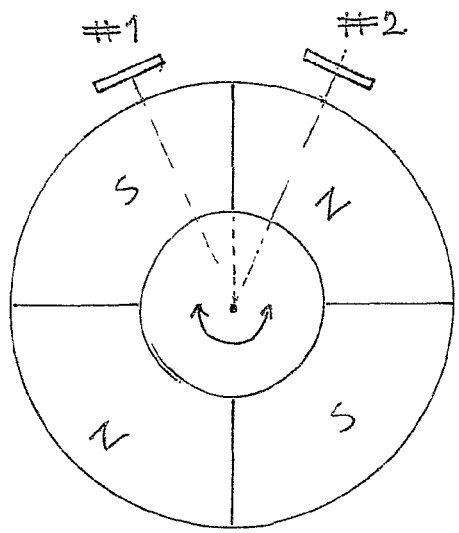
Fig. 4
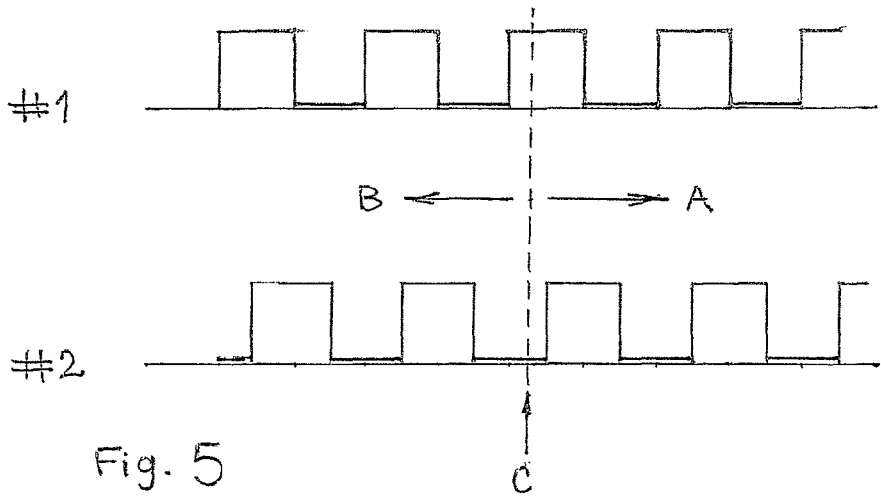
Fig. 5
| A: | H | H | L | L | H | H | L | L | → FORWARD |
|---|---|---|---|---|---|---|---|---|---|
|    | L | H | H | L | L | H | H | L |  |
| B: | H | L | L | H | H | L | L | H | → REVERSE |
|---|---|---|---|---|---|---|---|---|---|
|    | L | L | H | H | L | L | H | H |  |
Fig. 6.

LINEAR ACTUATOR

BACKGROUND OF THE INVENTION

1. Field of the Invention

The invention relates to a linear actuator.

2. The Prior Art

The explanation of the invention departs in a linear actuator of the type comprising a linear sliding tubular activation element. A linear actuator comprises an electric motor, which over a transmission drives a spindle. On the spindle is mounted a spindle nut, to which the tubular activation element is secured with its one end. The other end of the tube section is secured with a front fixture to the movable element in the construction, in which the actuator is built in, while the actuator with a rear fixture is secured in the stationary part of the construction or vice versa. During the fastening of the spindle nut, it will either move outwards or inwards on the spindle depending on the direction of rotation, and the tube section thus moves axially outwards or retracts in a manner corresponding to the piston rod on a telescopic cylinder.

Determination of the position of the tube section is typically done by counting the number of rotations of the spindle. The number of rotations multiplied by the thread pitch of the spindle determines the position of the tube section. An absolute determination of the position can be carried out by means of a rotary potentiometer, which over a gear is driven by a motor. When the gear ratio is known the number of rotations done by the spindle can be calculated. A more prevalent way of determining the position is by using a magnetic encoder. A magnetic encoder comprises a magnetic frame yoke with a number of poles, which activate a Reed-switch or a Hall-sensor every time one of the poles passes by the switch, alternatively the Hall-sensor, at which an electric signal is discharged.

For a more detailed description of the Reed switch is referred to U.S. Pat. No. 2,264,746 to Ellwood. In short, a Reed-switch is an electro mechanical component, in which a contact set, consisting of two springy metal terminals, forms an electric connection under the influence of a magnetic field. As it is a component with movable parts it will limit the physical dimensions, choice of materials, life span and operation velocity.

In U.S. Pat. No. 7,003,828 B2 is shown an actuator system with an arrangement for position detection, consisting of a pulse provider in the form of a Reed-switch, influenced by a magnetic frame yoke. For the system the limitation outlined in column 3 line 61 to column 4 line 3 applies. The imperfection is that the inertia in the mechanical system leads to unregistered counting steps. The imperfection arises in that the counting system depends on an activation of the control buttons. For one thing to indicate the direction of movement and with that, if the counter should count up or down, but also in order for the counter basically to register and count the activations of the Reed-switch. As the imperfection over time will accumulate, a reset function of the counting cycle is introduced in a well-defined position, namely when the piston of the actuator is fully retracted.

Unlike a Reed-switch, a Hall-sensor is a non-mechanical component, which varies its output voltage depending on the strength of a printed magnetic field. It is distinguished between Hall-transducers, which respond with a voltage analogously proportional to the strength of a printed magnetic field and Hall switches, which discharges a digital signal corresponding to whether a magnetic field of a given strength is printed or not. This will typically appear by a voltage level on the exit of the component, which jumps between a low level close to 0 volt and a high level, close to the supply voltage of the component, without being in other states than these two extremes. Even though the signal level of the exit here is described as a source system it is, however, not excluded that output can be of the open collector type, which is a drain system. It is intended not to be able to supply an output voltage, but serve as an electronic contact with connection to the negative pole of the supply voltage. By fitting out with extern components the output signal can be designed in preparation for adaptation for interface with micro processor or another counting mechanism. Internally in the Hall switch mechanisms are implemented, which counteract bounce by defining a suitable hysteresis for the transition states. This counteracts the need for calibration, as the number of erroneous counting pulses is minimized. Simultaneously a Hall sensor is a fully semiconductor based component with the advantages in consequence in the form of size, price and life span. For further information concerning Hall sensors reference is made to manufacturers of these for instance the company, Micromagnetics.

It is therefore noted that each time a magnetic pole is lead past a Reed switch or a Hall sensor, this will release a signal. When using a magnetic encoder, with a magnetic ring with four poles, the position is thus determined for each quarter of a rotation of the spindle. Two Hall sensors can be used, at which the position is determined eight times per rotation.

Alternatively to a magnetic encoder an optical encoder may be used, which works in the same manner, namely with a rotating disk with penetrations and a light source. When a penetration passes by the light source, a light beam temporary passes through to a photoelectric cell, which with that releases a signal. On the basis of the signals, the position is calculated by means of a micro processor in the control unit.

From U.S. Pat. No. 5,224,429 an actuator system is known, where optical sensors are used for determining the position from the rotations of the motor (FIG. 6). However, it is not described here how the control unit determines the direction of rotation of the spindle. This will result in that a potential manual adjustment can influence a wrong position indication. The price level for optical sensors compared to magnetic alternatives, however, makes this solution less attractive as the marked for actuators is submitted to a heavy price competition.

An absolute determination of the position is preferred, but when Hall sensors and Reed switches are uses it is partly due to costs and partly due to reliability reasons. Potentiometers are relatively expensive and are from a purely mechanical point of view worn-out in time. This wear appears as fully or partially interruption of connection between the guide shoe of the potentiometer and the resistive distance on the potentiometer. The wear can over time cause a change in the resistive linearity of the potentiometer over the full dynamic range, which will influence the accuracy of the position determination. Furthermore, the regulation area at the ends cannot be fully used. Another and more unnoticed moment is that it takes about a year to test the reliability of a potentiometer in an actuator, which means that it is not possible just to replace a potentiometer with another kind. If the supplier changes the construction of the potentiometer, the testing must be redone.

The object of the invention is to provide a solution to the outlined problem, namely to achieve an absolute positioning without the disadvantages of rotary potentiometers.

SUMMARY OF THE INVENTION

This is achieved according to the invention by designing the actuator such that an absolute position determination can be achieved by means of position sensors, such as Hall sensors or Reed switches. The first time, an initiating procedure, where the nut/spindle is moved from a first desired point on the spindle/nut to a second desired point on the spindle/nut is carried out. The number of signals from the incremental position sensors, appearing by it, is registered as a measurement for the length of stroke. The position is subsequently determined in relation to that, i.e., by a fraction, where the numerator is the present number of signals and the denominator is the total number of signals over the length of stroke. For registration of the signals it is important that the control unit is active before and after the operation of the motor and of course also during the operation of the motor. The control unit should thus constantly be under voltage and be equipped with a battery backup, to ensure that the position indication is not lost provided that the connection to the power network is interrupted. Hereby, it is also ensured that the position is not lost even though a manual adjustment is made. Alternatively, the micro processor can store data in a memory, which does not loose data when the supply voltage is absent. Here a possible manual adjustment could result in counting errors.

it stands to reason that the accurate linear movement of the piston rod of the actuator, expressed in counted pulses, simply can be converted into accurate measurement, by multiplying the number of pulses by a factor, expressing the thread pitch of the spindle compared the number of rotations.

The invention aims to that the position determination is expressed in the same way as when using a potentiometer. In a potentiometer it is the proportion between the voltage over the potentiometer and the voltage level on the shoe of the potentiometers which is a proportional expression for the position of the spindle nut on the length of stroke of the spindle. In the same way the counted number of pulses from a known point, preferably a mechanical end stop, expresses a given position of the spindle nut. If proportioned to the previous counted number of pulses between two positions, typically the two end stops, an expression, describing the position of the spindle nut compared with the length of stroke, is achieved, which with that expresses the traveling of the activation element. On the grounds of the counted number of pulses compared with the number of pulses, corresponding to the desired length of stroke of the actuator, the fraction, which is drawn up for the traveling of the activation element, relatively conform to the length of stroke of the actuator This fraction can therefore be employed to create an output voltage, which is an proportional expression for this. The expression can be created directly by using a D/A converter, which converts the counting ratio into a relative voltage level. As D/A converters are expensive a cheaper solution is invented as part of the invention and will be described with an example.

In the example, the length of stroke is referred to as "S" and the travel of the spindle nut from the physical end stop is referred to as "L", which is expressed in the micro processor by the counted number of pulses over the travel of the spindle nut from the physical end stop. The micro processor initially values the output highly and makes use of an intern clock frequency as trigger signal for a counter, incriminating itself for each trigger pulse. It is always compared the number "L". When the number "L" is reached, the output is valued low and the counting continues until the number "S" is reached, where after the procedure is repeated. As expression for the position of the spindle nut on the length of stroke, a pulse modulated signal can now be obtained, where the duty-cycle directly expresses the position of the spindle nut in proportion to the full length of stroke. This signal is lead through a low-pass filter in order to become a mean value and appear as a DC voltage. As can be experienced, an outer unit would not be able to tell whether this or a solution with a potentiometer was used in the actuator, but the solution described here is both cheaper and sturdier. By a possible replacement of a defective part, using a potentiometer with a new part using the solution described in the invention, full compatibility will be obtained.

That the example mentions an output, which accurately correspond to what can be expected when using a potentiometer, namely a DC voltage, does not exclude that the position determination can be expressed differently. It would be obvious for interface between more micro processors, directly to continue the fraction expressing the position compared with the length of stroke or as pulse width modulated signal (PVM). A standardized interface could also be used like for instance RS232 between micro processor and other equipment, which further requires a prearranged protocol for transmitting and receiving data. Other interfaces by means of light and optical connections may also be envisaged used. Interfaces, which are frequently used in industrial equipment where a current or voltage is converted into a frequency modulated signal, are also not excluded. (Here, meaning the use of VF converters.)

By known actuators a determination of the position and the length of stroke in that the end stop switches are mounted on a strip of printed circuit board with a row of holes where the end stop switches can be mounted for fulfillment of the concrete specifications. Actuators with movable end stops are known from DE 89 03 603 to Dewert and WO 02/102205 A1 to Cimosys. Anyhow, it is very elaborate to adjust the position and the length of travel of the activation element. By invention it is however relatively simple to redefine the length of stroke and its position, at any time, as a renewed initiating procedure on the new specifications just needs to be done.

A linear actuator according to the invention will be explained more fully below with reference to the accompanying, drawings.

BRIEF DESCRIPTION OF THE DRAWINGS

FIG. 1 shows a longitudinal section through the actuator,
FIG. 2 shows a section of the area surrounding the worm drive,
FIG. 4 shows a simplified diagram of the Hall sensor system,
FIG. 5, shows a pulse sequence of the Hall sensor system,
FIG. 6 shows a Gray-code for the direction of movement and
FIG. 7, shows a flow diagram for the sensor system.

DETAILED DESCRIPTION OF THE PREFERRED EMBODIMENTS

Figure 3:
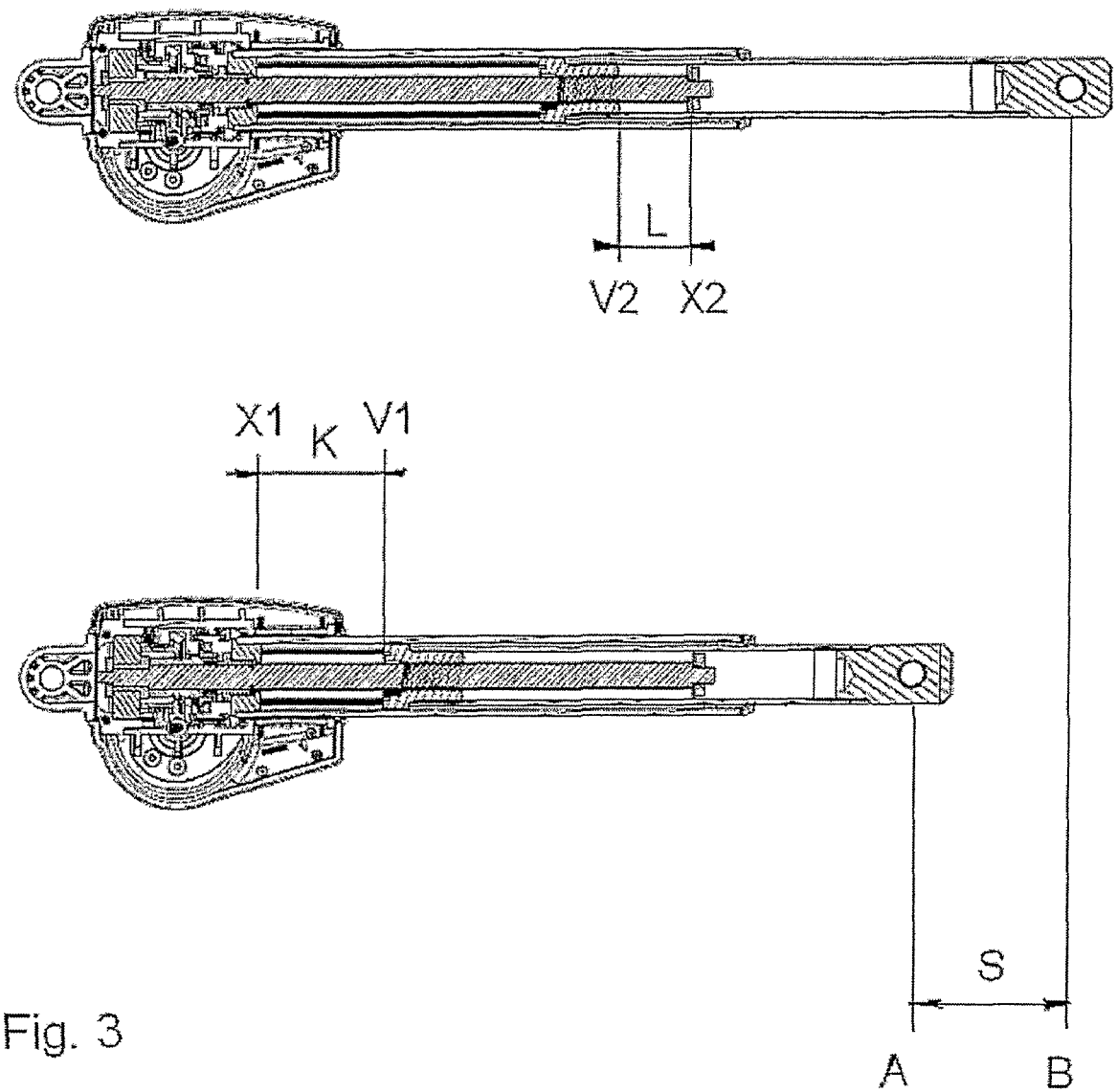
FIG. 3 shows virtual end stops.

As it appears from FIG. 1 of the drawings, the main components of the actuator consist of a housing 1, in two parts, with a reversible DC-motor 2, which over a worm drive 3 drives a spindle 4 with a spindle nut 5, to which a tubular activation rod 6 (inner tube) surrounded by an outer tube 7 is secured. The base construction of the actuator is incidentally of the type stated in WO 02/29284 and reference to it is incidentally made.

As can be seen from FIG. 2, a couplings part 8 of the worm wheel is equipped with a magnetic frame yoke 9 with four poles, for determination of the position of the activation rod 6. In this connection two Hall sensors 11, of which only one is visible while the other is hidden under the couplings part 8, are mounted on a small print 10. By rotation of the magnetic frame yoke the Hall sensors are activated when a pole passes by these, and a signal is in that way discharged to a control unit, which via a micro processor calculates the position of the activation rod 6 by the rotation, its direction and the thread pitch of the spindle. In that the two Hall elements are angular displaced, it is possible to detect the direction of rotation of the spindle (quadrature detection) and thereby determine whether the signals are to be added or subtracted, depending on the direction of rotation of the spindle and with that whether the activation rod 6 is moved outwards or retracted.

If for instance a length of stroke from point A to B is desired, initiating procedure is done, where the spindle nut is brought to position A. The spindle nut is thereafter moved to position B at the same time as the number of signals from the Hall-sensors is counted and registered in the micro processor. The positions A and B are determined as end stops, and a random position of the spindle nut and thereby the position of the activation rod between these two end stops is determined in proportion to the total number of signals registered over the length. Typically the calibrated extremities will be the physical end stops, but as it appears it is not excluded that it can be other positions of the spindle nut on the length of the spindle.

In FIG. 3 the virtual length of stroke S is shown as the distance between the two virtual end stops A and B, corresponding to the points V1 and V2 shown in proportion to the position of the spindle nut on the spindle. X1 and X2 are the physical end stops, relating to the virtual end stops with the distances K and L.

Figure 7:
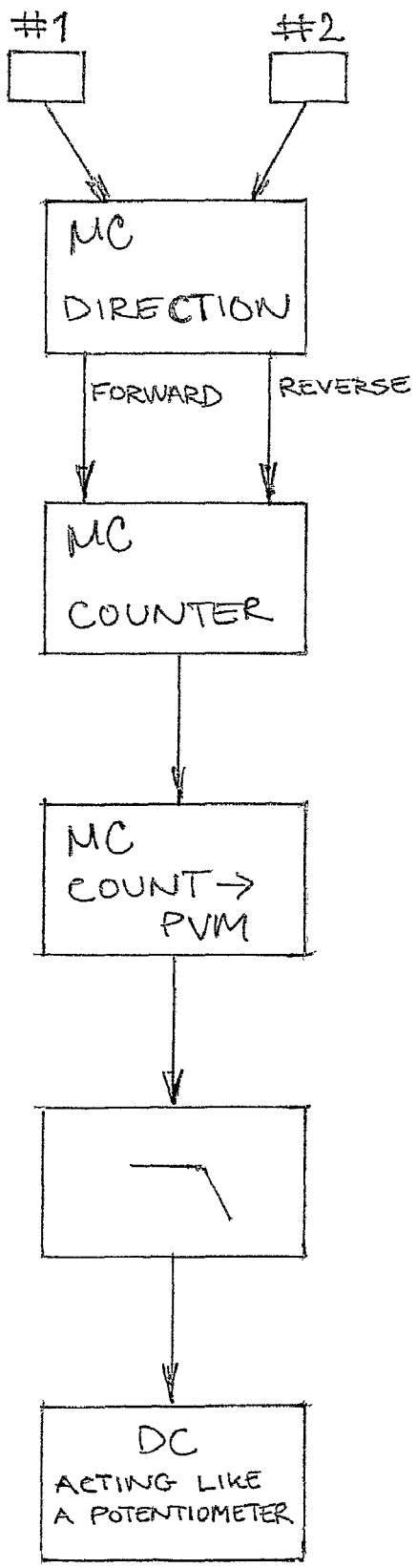

As it appears in FIG. 4, the two Hall-sensors (#1, #2) are angular displaced about 45 degree, when it, as is the case here, is a question of a four poled magnetic ring. Characteristic of the signal transmission from the Hall-sensors in the given mutual position is that they meet the requirements for Gray-code, i.e. that only one signal or bit changes at a time. The location of the sensors, in the form of their mutual angling, must therefore be chosen on the basis of this criterion. A pulse train from the sensor system can thus look like show in FIG. 5, where the two Hall-sensors are referred to as #1 and #2 respectively. The cursor (C) indicates a random position corresponding to a position of the spindle nut on the length of stroke of the spindle. If the cursor is moved in the direction of A, the pulse pattern over the movement will correspond to what is stated under A:. Correspondingly, the pulse pattern, stated under B:, corresponds to a movement of the cursor in the direction B. The same pulse patterns are in FIG. 6 indicated in connection with the moved direction, where it is evident that the two patterns are different and therefore possible to use partly for a determination of the movement but also to detect in which direction the movement occurs. As it appears in FIG. 7, the micro processor (uC) is fed with the signals from the Hall-sensors. From this the result, in the form of the relative number compared to full scale, is created. This number is converted into a PVM signal, which is averaged and appears as a relative DC signal, which accurately corresponds to the function of a potentiometer. All sub signals can of course be selected and forwarded to an extern unit if desired.

An actuator with a tubular piston rod is described above, but as stated, the invention also applies to actuators, where the spindle nut is constructed as an activation element, cf. DK 174 457 to Linak A/S, or where the spindle is displace axially, cf. WO 02/24034 Cimosys, the embodiment according to FIGS. 1-4.

The invention thus provides a linear actuator, where an absolute position determination is achieved with incremental sensors, and simultaneous an optional determination of the length of stroke and its position and immediate possibility of changing the same at any time is achieved. This means that a virtual actuator with changed characteristics for the dynamics area can be produced on basis of a physical actuator. This can be expressed by the retracted position of the spindle nut, which to all intents and purposes freely can be a position on the length of stroke of the physical actuator. Consequently, this will appear as an end stop although not physical but electronically provide by means of a micro processor and software. Accordingly the maximum desired movement of the spindle nut away from an end stop, physical or virtual, is created as another virtual end stop. Other of the length of stroke of the spindle can be stored and used as preset. This means that that same physical actuator can be employed for a number of purposes, and during the initialization of pre-programming in a simple manner can be brought to fit the application perfectly. For the manufacturer of the actuator it is logistically advantageous to have less different item numbers and a larger and more efficient production of a standard item can then be achieved. For the user it means a better delivery security for replacement of defective parts. When replacing a defective actuator with a new, the new physical actuator will regardless of length of stroke as long as this is not shorter than the length of stroke of the virtual actuator or so long that mechanism in the construction prevents the actuator from bringing the spindle nut in position against the physical end stops, function as the former virtual actuator and in that way provide further savings in terms of rapid service and maintenance. The calibration of the position of the spindle nut during operation should not be necessary, as the sensors and micro processor are always active. However, it would be sensible to test the accuracy by comparing with clearly defined positions and when necessary execute a calibration. If mechanical end stops are used as calibration marks, it must be taken into consideration that these are flexible in order to protect the mechanical parts of the actuators. Depending on the velocity, with which the spindle nut is moved into end stop, different counting values may be obtained. This can, however, be counteracted partially by counting the number of pulses appearing when the spindle moves opposite after that motor has been cut off as a result of the over current protection, or by executing an extra calibration after the spindle nut has moved against an end stop. Physical end stops, such as end stop switches can also cause an error in the number of counting steps over the length of the spindle, as the inertia in the system will cause the system to move after the motor current is cut off. If the signal from the end stop switch also is forwarded to the micro processor and taken into the position calculation it will be possible to calculate the size of the error. The control may thus be adapted so that small errors are disregarded, while a larger is compensated for by driving the nut a little backwards.

Even though counting errors may occur in the solution under unfortunate circumstances, the accuracy, when disregard these, is far better than by use of conventional potentiometers, and for that reason appears as a much better solution, when the many advantages of the solution is taken into consideration.

Even though Hall sensors are used as position sensors in the description, the use of other technologies for determining the rotations of the spindle is not excluded. The term "micro processor", used in the description, covers any unit capable of meeting the requirements for data processing of the described process, executed by the micro processor mentioned in the description. That is to say a controller, PIC, AVR, RISC, HW based state-machine, ASIC or the like.

The invention claimed is:

1. A linear actuator comprising:
   an electric motor,
   a transmission,
   a spindle,
   a spindle nut, where the spindle nut and the spindle between a first and a second point, indicating the length of stroke, can move axially in proportion to each other, depending on whether the spindle or the spindle nut is driven around via the transmission,
   incremental position sensors for determining the direction of rotation and position of the spindle nut/the spindle,
   a control unit comprising a micro processor for receiving signals from the position sensors and on this basis determining the position, and
   a power supply,
   wherein an initiating procedure, where the nut/spindle is moved from a first point on the spindle/nut to a second point on the spindle/nut for the first time, the number of pulses derived from the incremental position sensors are registered as a measurement for the length of stroke, and the position is subsequently determined in relation thereto, and the control unit is active before, during and after the operation of the motor.

2. The linear actuator according to claim 1, wherein at least the first or the second point is an end stop.

3. The linear actuator according to claim 2, wherein the end stop is an end stop switch.

4. The linear actuator according to claim 2, wherein the end stop is a mechanical end stop.

5. The linear actuator according to claim 1, wherein the position detection of the spindle nut is discharged in the form of a current signal.

6. The linear actuator according to claim 1, wherein the position detection of the spindle nut is discharged in the form of a voltage signal.

7. The linear actuator according to claim 1, wherein the position detection of the spindle nut is discharged in the form of a signal being a light beam.

8. The linear actuator according to claim 1, wherein the position detection of the spindle nut is discharged in the form of a pulse modulated signal.

9. The linear actuator according to claim 1, wherein the position detection of the spindle nut is discharged in the form of a frequency modulated signal.

10. The linear actuator according to claim 1, wherein said incremental position sensors comprise two Hall sensors.

11. The linear actuator according to claim 1, wherein said incremental position sensors comprise two Reed switches.

* * * * *